(12) United States Patent
Cappiello et al.

(10) Patent No.: US 11,508,133 B2
(45) Date of Patent: Nov. 22, 2022

(54) AUGMENTED REALITY VISUALIZER AND MEASUREMENT SYSTEM FOR SWIMMING POOL COMPONENTS

(71) Applicant: Latham Pool Products, Inc., Latham, NY (US)

(72) Inventors: Will Cappiello, Latham, NY (US); Joel Culp, Latham, NY (US); Scott Mocha, Latham, NY (US); Scott Reynolds, Latham, NY (US)

(73) Assignee: Latham Pool Products, Inc., Latham, NY (US)

( * ) Notice: Subject to any disclaimer, the term of this patent is extended or adjusted under 35 U.S.C. 154(b) by 0 days.

(21) Appl. No.: 17/186,616

(22) Filed: Feb. 26, 2021

(65) Prior Publication Data

US 2021/0272369 A1    Sep. 2, 2021

Related U.S. Application Data

(60) Provisional application No. 62/982,104, filed on Feb. 27, 2020.

(51) Int. Cl.
*G06T 19/00* (2011.01)
*G06T 7/13* (2017.01)
(Continued)

(52) U.S. Cl.
CPC .......... *G06T 19/006* (2013.01); *G06F 3/0482* (2013.01); *G06F 3/04842* (2013.01);
(Continued)

(58) Field of Classification Search
CPC .......... G06T 19/006; G06T 7/13; G06T 7/62; G06T 2207/30208; G06T 2207/30204;
(Continued)

(56) References Cited

U.S. PATENT DOCUMENTS 10,929,670 B1 *  2/2021  Troy ................... G06T 19/006
2008/0246974 A1 * 10/2008  Wilson ................ G01B 11/24
                                              33/290

(Continued)

OTHER PUBLICATIONS

Nehlich, "Yard: Augmented Reality for Swimming Pools, Outdoor Kitchens and Hardscapes", Available Online at https://blog.structurestudios.com/software/yard-augmented-reality-for-swimming-pools-outdoor-kitchens-and-hardscapes, Apr. 25, 2018, pp. 1-17 (Year: 2018).*

*Primary Examiner* — William A Beutel
(74) *Attorney, Agent, or Firm* — Kilpatrick Townsend & Stockton LLP (57) ABSTRACT

An augmented reality visualizer and measurement system for swimming pool components (e.g., liners and safety covers) is provided in some examples of the present disclosure. In one example, a system can receive images of physical markers positioned spatially around a perimeter of a swimming pool in real space. The system can identify the physical markers in the images by analyzing the images using one or more image processing techniques. The system can determine one or more characteristics of the swimming pool based on relationships between the physical markers. The system can then generate pool component information based on the determined one or more characteristics of the swimming pool, and output the pool component information.

20 Claims, 11 Drawing Sheets

(51) Int. Cl.
*G06F 3/04842* (2022.01)
*G06F 3/0482* (2013.01)
*G06T 7/62* (2017.01)

(52) U.S. Cl.
CPC ................. *G06T 7/13* (2017.01); *G06T 7/62* (2017.01); *G06T 2207/30208* (2013.01)

(58) Field of Classification Search
CPC ..... G06T 7/73; G06F 3/0482; G06F 3/04842; G06F 3/04815
See application file for complete search history.

(56) References Cited

U.S. PATENT DOCUMENTS

| | | | | |
|---|---|---|---|---|
| 2010/0110074 | A1* | 5/2010 | Pershing | G06F 30/13 345/423 |
| 2016/0147408 | A1* | 5/2016 | Bevis | G02B 27/017 715/850 |
| 2020/0410576 | A1* | 12/2020 | Salmonson | G06T 19/00 |

* cited by examiner

AUGMENTED REALITY VISUALIZER AND MEASUREMENT SYSTEM FOR SWIMMING POOL COMPONENTS

CROSS-REFERENCE TO RELATED APPLICATIONS

This claims the benefit of priority under 35 U.S.C. § 119(e) to U.S. Provisional Patent Application No. 62/982,104, filed Feb. 27, 2020, the entirety of which is hereby incorporated by reference herein.

TECHNICAL FIELD

The present disclosure relates generally to swimming pools. More specifically, but not by way of limitation, this disclosure relates to an augmented reality visualizer and measurement system for swimming pool components.

BACKGROUND

Customers often purchase components for their swimming pools. One example of such components can include accessories, like liners or safety covers. Customers generally take into account a variety of considerations when choosing appropriate components for their swimming pools. For example, customers often consider the size, shape, and color of such components. Typically, pool manufacturers provide product catalogues that describe their pool components to aid the customer with these considerations. But visualizing what pool components will look on a customer's swimming pool still requires a great deal of imagination on the part of the customer.

Additionally, many components work best when they are customized to fit the size and shape of a customer's pool. To obtain the best fit, a pool component manufacturer will often send a technician to the customer's property to manually measure various aspects of the customer's swimming pool, such as its perimeter and shape. The technician can then use those measurements to customize a component to fit the pool. But this is an expensive, time consuming, and manual process that is inconvenient for both the customer and the pool component manufacturer.

DETAILED DESCRIPTION

Certain aspects and features of the present disclosure relate to an augmented reality visualizer and measurement system for swimming pool components. In some examples, the system can perform photogrammetry using images of a swimming pool to determine one or more characteristics of the swimming pool, such as the perimeter and shape of the swimming pool. The measurement system can then transmit the one or more characteristics to a pool component manufacturer via the Internet. This can enable a pool component to be custom fit to the swimming pool more rapidly, cheaply, and efficiently than may otherwise be possible. Additionally, the system can use the images to generate an augmented reality environment that depicts a virtual version of a pool component (e.g., an accessory like a pool safety cover) overlaying an image of the swimming pool in real space. This can enable a user to more easily visualize what the pool component will look like in the context of the swimming pool.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
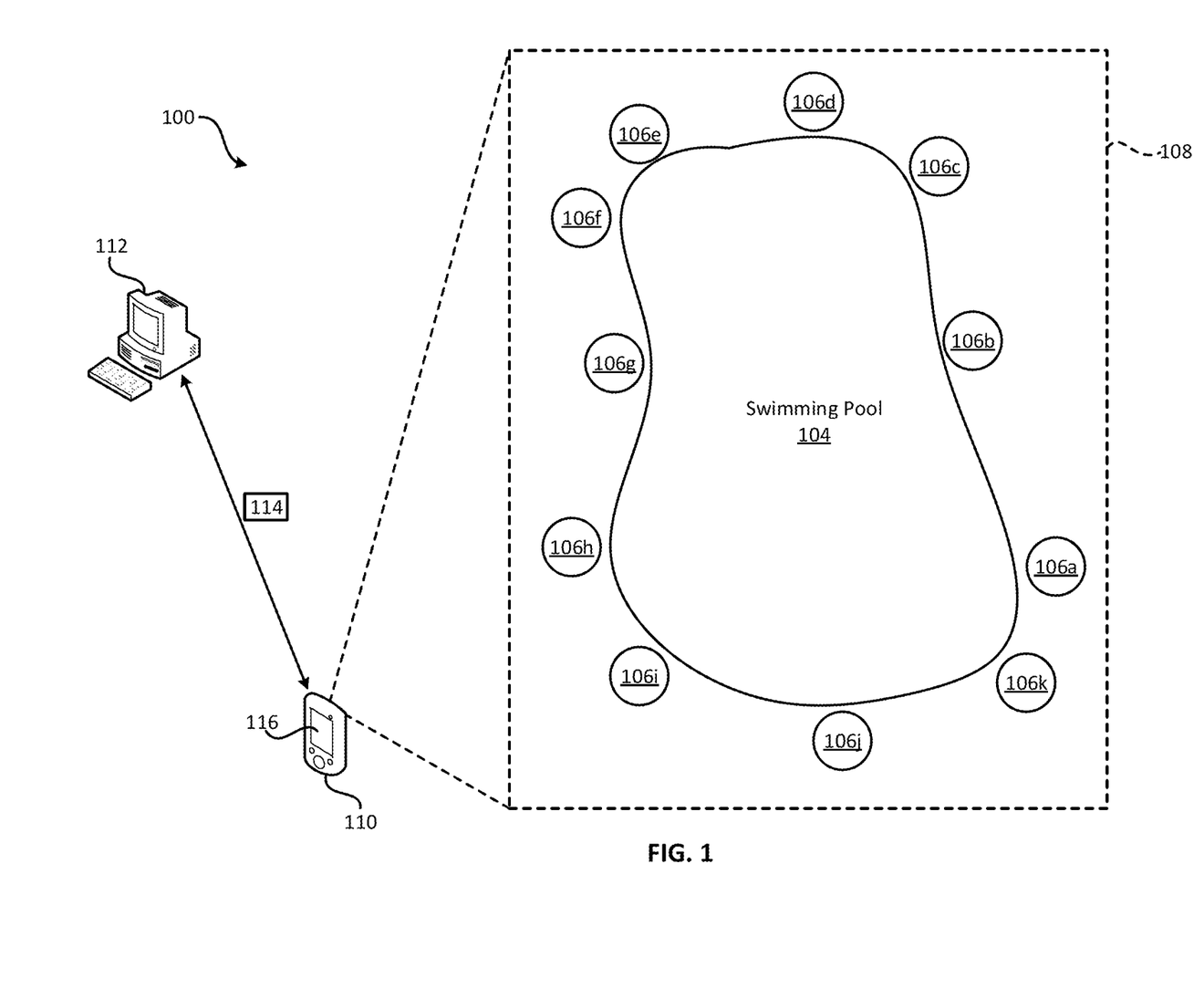
FIGS. 1-3 illustrate schematic diagrams of an example of an augmented reality visualizer and measurement system for swimming pool components according to some aspects of the present disclosure.
Figure 2:
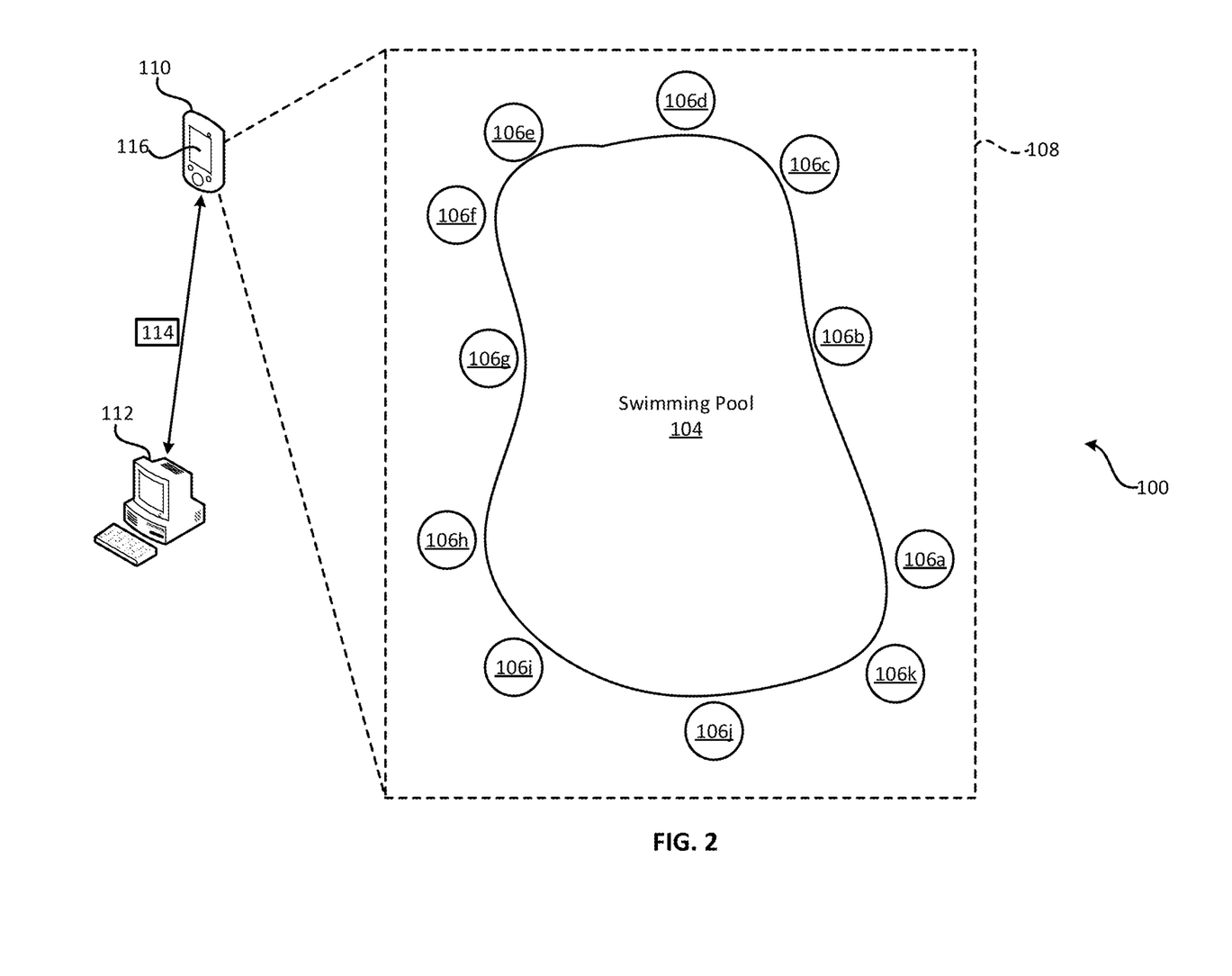
Figure 3:
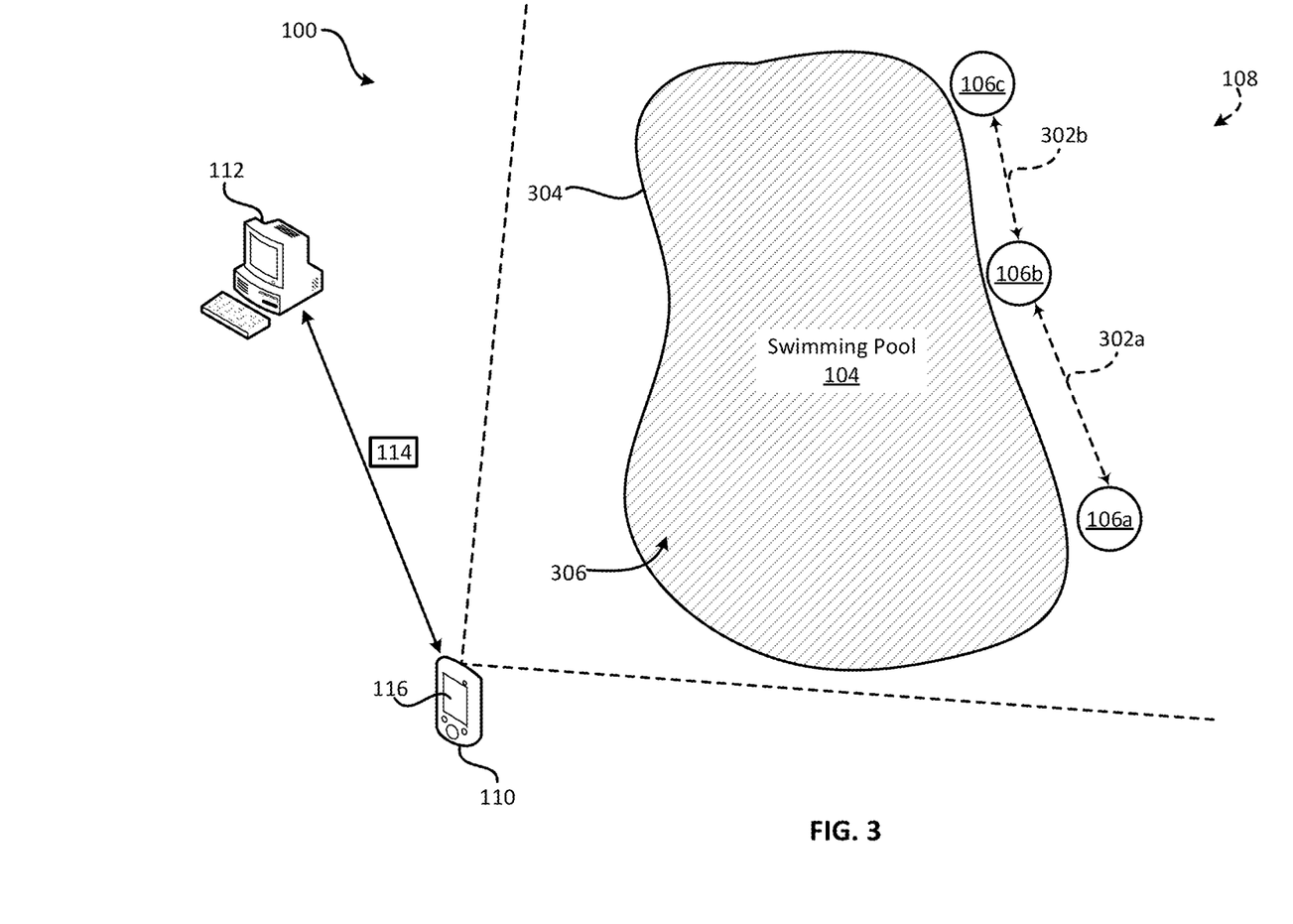

FIGS. 1-3 are top-down views of an example of an augmented reality visualizer and measurement system 100 for swimming pool components according to some aspects of the present disclosure. The system 100 includes a computing device 110 coupled to a camera for capturing images of a target area 108 that includes a swimming pool 104. One example of the computing device 110 can be a handheld device, such as a mobile phone, tablet, or laptop computer, which may have a camera built in. The computing device 110 can use the captured images to determine perimeter characteristics (e.g., the perimeter and shape) of the swimming pool 104. The perimeter characteristics can then be used to properly fit one or more pool components to the swimming pool 104.

More specifically, the target area 108 can include physical markers 106 positioned proximate to a perimeter of the swimming pool 104. The physical markers 106 can aid with determining the perimeter characteristics of the swimming pool 104. In some examples, the physical markers 106 can be separate devices from the swimming pool 104 and positioned around the perimeter of the swimming pool 104 by a user. In some such examples, the physical markers 106 can be designed to have a color, pattern, shape, or size that makes them more distinguishable in the images from parts of the swimming pool 104 and the background environment. For instance, the physical markers 106 may be triangular in shape and red in color, to make them more distinguishable from other features in the target area 108. Of course, any other suitable shapes and colors may be used for the physical markers. In other examples, the physical markers 106 may be physical features of the swimming pool 104 itself (e.g., indentations, cracks, or markings on the pool's housing or liner).

A user can move the camera (e.g., the computing device 110 containing the camera) to multiple locations around the target area 108 and use the camera to capture images of the target area 108 and the physical markers 106, e.g., from different angles as depicted in FIGS. 1-2. The computing device 110 can then identify the physical markers 106 in the images by analyzing the images using one or more image processing techniques, such as edge detection, segmenting, and smoothing. The computing device 110 can use the locations of the physical markers 106 to perform photogrammetry on the multiple images and thereby generate a virtual model (e.g., a three-dimensional model) of at least a portion of the swimming pool 104, such as the perimeter of the swimming pool 104. The computing device 110 can then determine perimeter characteristics of the swimming pool 104 based on the virtual model.

For example, the computing device 110 can determine the perimeter of the swimming pool 104 based on the virtual model. An example of this process will now be described with reference to FIG. 3. The computing device 110 can begin by determining a distance 302a in real space between two of the physical markers 106a-b. A user can manually measure the distance 302a in real space and provide the distance 302a as user input to the computing device 110, or the computing device 110 can automatically compute the distance 302a. Either way, the distance 302a can serve a benchmark to calibrate the computing device 110, so that the computing device 110 can determine a respective distance in real space between each pair of physical markers 106 around the swimming pool 104. For example, the computing device 110 can determine a first virtual length between physical markers 106a-b based on the virtual model, and a second virtual length between physical markers 106b-c based on the virtual model. The computing device 110 can then determine a ratio between the first virtual length and the second virtual length. The computing device 110 can apply the ratio to the distance 302a between the physical markers 106a-b, in order to determine another distance 302b in real space between the physical markers 106b-c. The computing device 110 can repeat this process for some or all of the pairs of physical markers 106 around the swimming pool 104 to determine a respective distance in real space between each pair of physical markers 106. This can enable the computing device 110 to quickly and automatically calculate the respective distances between the physical markers 106, even when the physical markers 106 are not spaced at uniform intervals around the perimeter of the swimming pool 104. After determining the respective distances, the computing device 110 can then add together the respective distances between each pair of physical markers 106 to determine a perimeter of the perimeter 304 of the swimming pool 104.

The computing device 110 can additionally or alternatively determine a shape 306 (e.g., a rectangular, oval, kidney, circular, etc.) of the swimming pool 104. In some examples, the computing device 110 can determine the shape 306 of the swimming pool 104 based on the virtual model. Since the physical markers 106 are located around the perimeter 304 of the swimming pool, the virtual model's shape will be reflective of the shape 306 of the swimming pool 104. So, the computing device 110 can derive the swimming pool's shape 306 from the virtual model. In other examples, the computing device 110 can determine the shape 306 by performing edge detection on the multiple images received from the camera. For example, the computing device 110 can use edge detection to determine multiple edges between the swimming pool 104 and a pool coping or decking. The computing device 110 can then determine the perimeter boundary of the swimming pool 104 based on the detected edges, and determine the shape 306 based on the perimeter boundary. Still other examples can combine the above two approaches, for example by using the virtual model as a starting point for the shape 306 and then further refining the shape 306 using edge detection, or vice-versa.

After determining the perimeter characteristics of the swimming pool 104, the computing device 110 can generate pool component information based on one or more of the determined perimeter characteristics. For example, the computing device 110 can generate the pool component information to include the determined perimeter and the determined shape. Additionally or alternatively, the computing device 110 can generate the pool component information to include transformed versions of the determined perimeter characteristics, for example as described in greater detail later on with respect to FIG. 4. The computing device 110 may then output the pool component information on a display 116, so that the user can provide this pool component information to a pool component manufacturer for customizing a pool component to fit the swimming pool 104. Additionally or alternatively, the computing device 110 can transmit the pool component information in an electronic communication 114 over a network (e.g., the Internet) to a remote computing device 112, such as a server or desktop computer. The remote computing device 112 may associated with the pool component manufacturer, so that the pool component manufacturer can receive the pool component information and fashion a pool component for the swimming pool 104.

Figure 4:
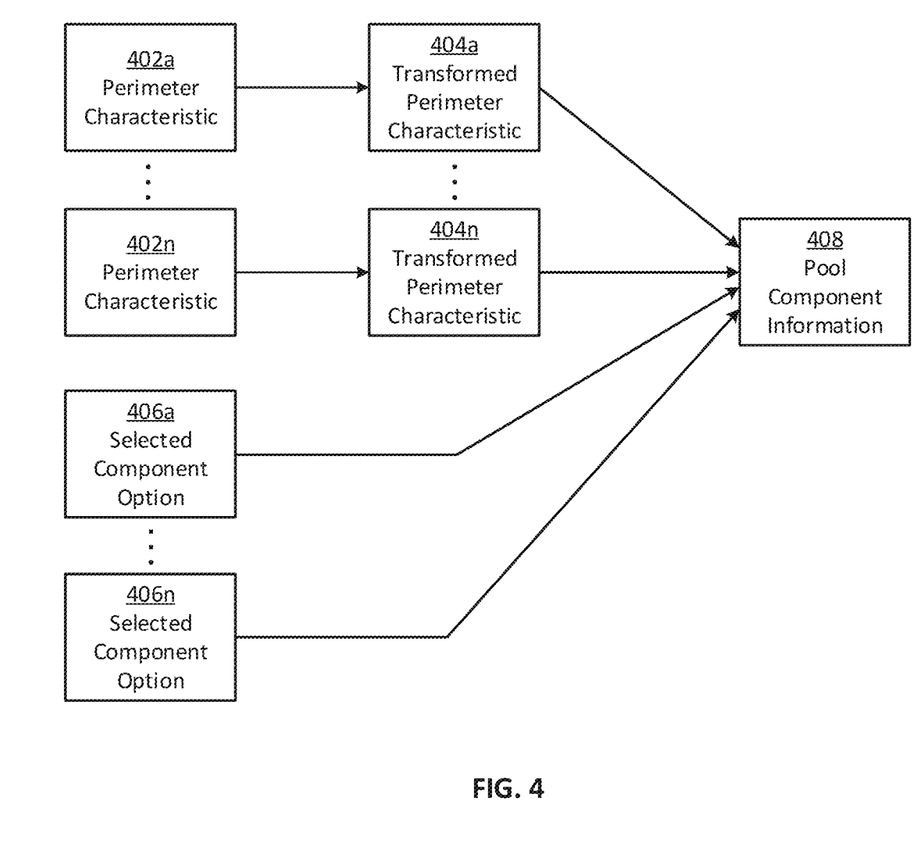
FIG. 4 illustrates an example of a process for generating pool component information according to some aspects of the present disclosure.

FIG. 4 illustrates an example of a process for generating pool component 408 information according to some aspects of the present disclosure. But other examples may involve more, fewer, or different steps then are shown in FIG. 4. The process generally involves the computing device 110 determining one or more transformed versions 404a-n of one or more perimeter characteristics 402a-n and incorporating the one or more transformed versions 404a-n into the pool component information 408. Generating a transformed version 404a of a perimeter characteristic 402a may involve transforming the perimeter characteristic 402a from a first format (e.g., that is not accepted by a pool component manufacturer) into a second format (e.g., that is accepted by the pool component manufacturer).

As one particular example, the computing device 110 can transform the determined shape of the swimming pool from a first format into a second format, where the second format defines a three-dimensional (3D) shape using a plurality of 3D plot points in a 3D coordinate system. This second format can be configured for use with a computer aided design (CAD) system of a pool component manufacturer. The computing device 110 can then provide, for example as an electronic communication via a network, the pool component information 408 in the second format to a remote computing device 112 associated with the pool component manufacturer. In response to receiving the pool component information 408, the remote computing device 112 can automatically supply the pool component information 408 to the CAD system, thereby initiating and facilitating manufacturing of the pool component.

Figure 5:
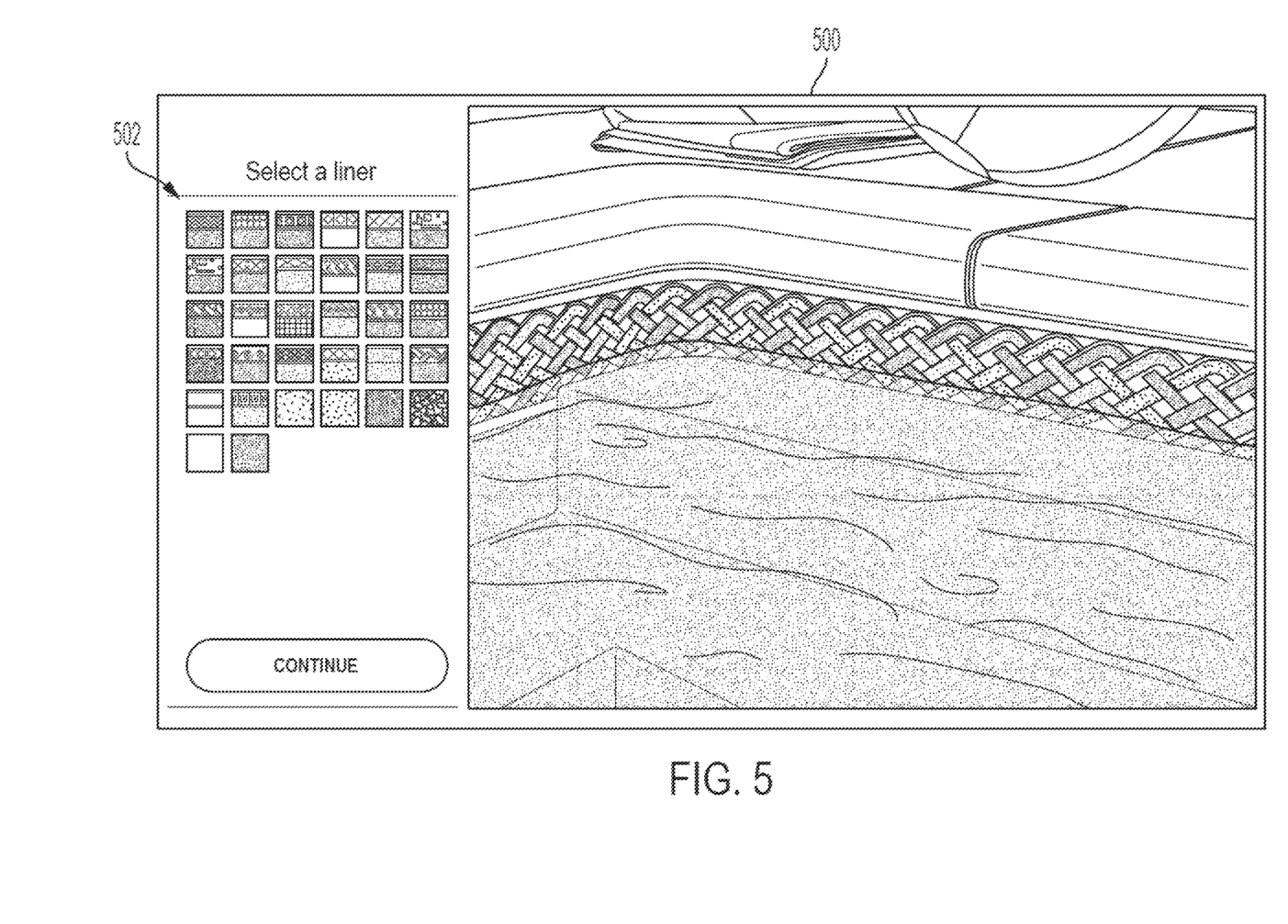
FIG. 5 is an example of a graphical user interface according to some aspects of the present disclosure.

Additionally or alternatively, the computing device 110 can generate the pool component information 408 based on one or more selected pool component options 406a-n. For example, the computing device 110 can generate a graphical user interface including a group of pool component options. One example of such a graphical user interface 500 is shown in FIG. 5. In the example of FIG. 5, the group of pool component options 502 includes different colors and patterns for a pool liner. But in other examples, the group of pool component options can include different types, patterns, colors, materials, ratings, prices, and/or manufacturers of pool components. The computing device 110 can receive one or more selections of one or more pool component options 406a-n from among the group of pool component options. The computing device 110 can receive the selection(s) as user input via the graphical user interface, in some examples. The computing device 110 can then generate the pool component information 408 based on the one or more selected pool component options 406a-n. For example, the computing device 110 can incorporate the one or more selected pool component options 406a-n into the pool component information 408. The pool component information 408 can then be conveyed to a pool component manufacturer, for example so that a component can be suitably customized according to the one or more selected pool component options.

Figure 6:
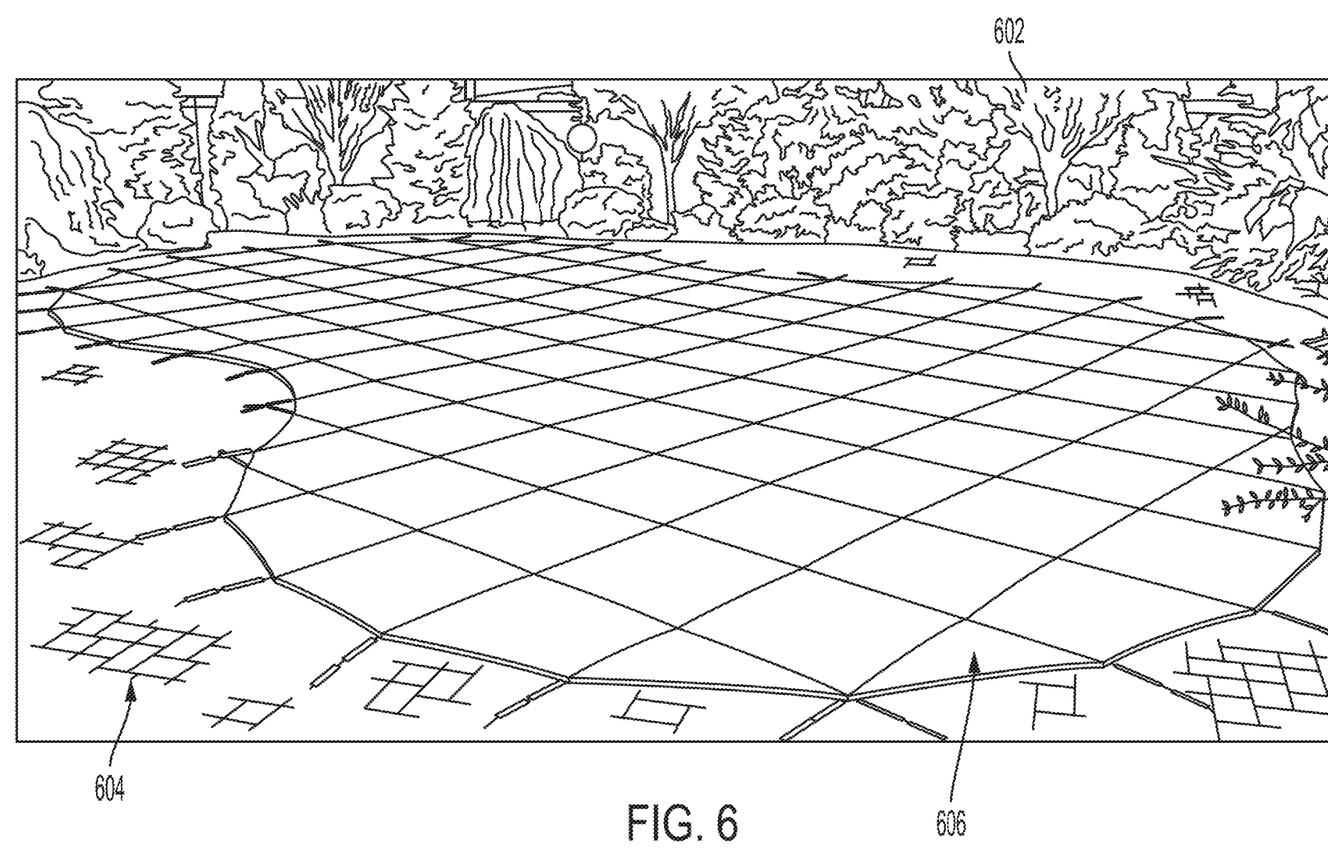
FIG. 6 is an example of an augmented reality environment output on a display of a computing device according to some aspects of the present disclosure.

Some examples of the present disclosure can also use augmented reality to aid users in visualizing pool components. FIG. 6 is an example of an augmented reality environment 602 output on a display 116 of a computing device 110 according to some aspects of the present disclosure. In this example, the augmented reality environment 602 depicts a virtual version of a pool safety cover 606 overlaying an image 604 of a swimming pool in real space. The image 604 can be one of the images obtained for determining the perimeter characteristics of the swimming pool (as mentioned above) or can be another image.

In some examples, the virtual version of the pool safety cover 606 may be pre-generated using an engine such as Unity 3D and stored in a datastore. The computing device 110 can retrieve the virtual version of the pool safety cover 606 from the datastore and then modify it for use in the augmented reality environment 602. For example, the computing device 110 can modify (e.g., scale or warp) the virtual version of the pool safety cover 606 based on the contours of the swimming pool depicted the image 604, so that the virtual version of the pool safety cover 606 properly overlays the swimming pool in the augmented reality environment 602. Additionally or alternatively, the computing device 110 can modify the virtual version of the pool safety cover 606 based on the pool component information. For example, the computing device 110 can modify the virtual version of the pool safety cover 606 to match a color, pattern, or material selected by a user, as indicated by the pool component information. The computing device 110 may also modify the virtual version of the pool safety cover 606 based the one or more characteristics of the swimming pool determined by the computing device 110, as indicated in the pool component information. Modifying the virtual version of the pool safety cover 606 in this way can produce a more accurate portrayal of the safety cover.

It should be appreciate that although FIG. 6 depicts an example involving a virtual version of a pool safety cover 606, other examples can involve virtual versions of other types of pool components, such as pool liners. FIG. 6 is intended to be exemplary and not limiting.

Figure 7:
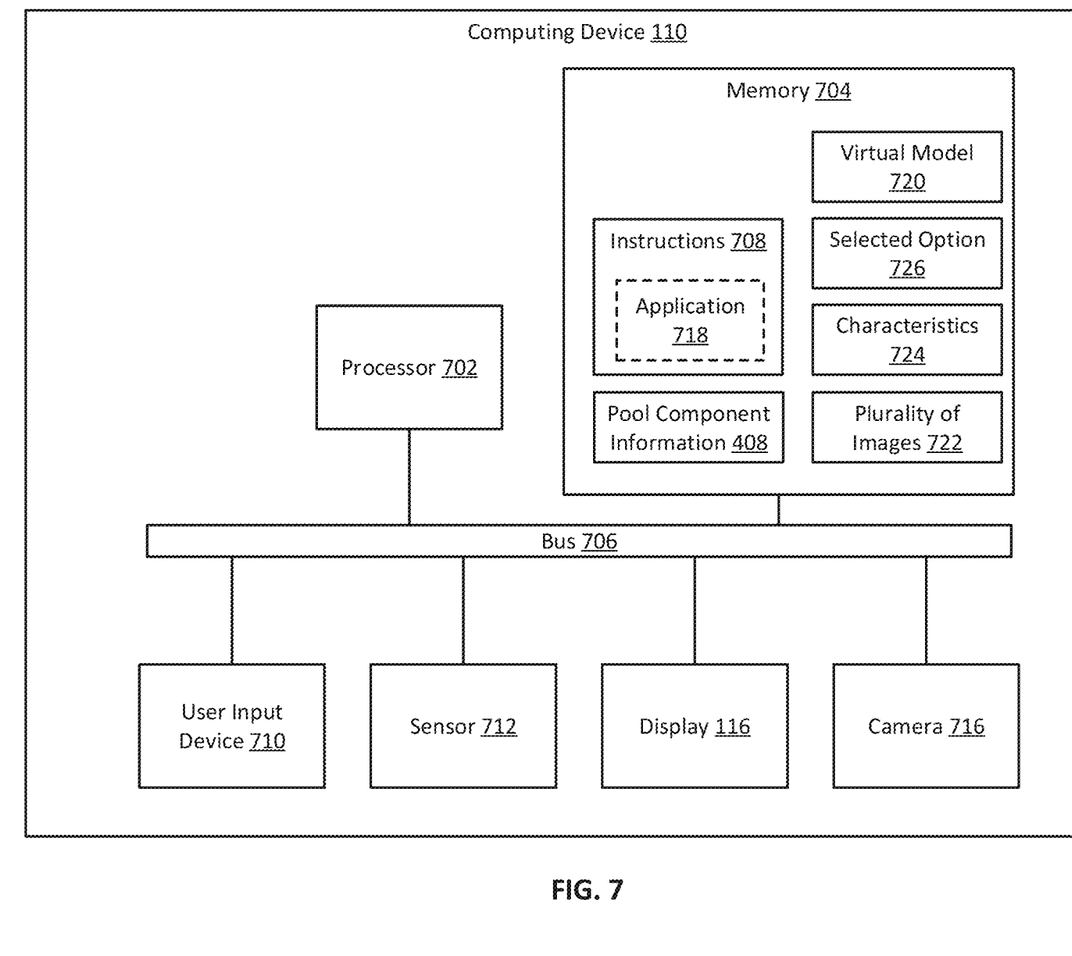
FIG. 7 is a block diagram of an example of a computing device according to some aspects of the present disclosure.

FIG. 7 is a block diagram of an example of a computing device 110 according to some aspects of the present disclosure. In some examples, the computing device 110 can be the handheld device or a wearable device, such as a head-mounted display (HMD) or smart watch.

The computing device 110 includes a processor 702 communicatively coupled to a memory 704 by a bus 706. The processor 702 can include one processor or multiple processors. Non-limiting examples of the processor 702 include a Field-Programmable Gate Array (FPGA), an application-specific integrated circuit (ASIC), a microprocessor, etc. The processor 702 can execute instructions 708 stored in the memory 704 to perform operations. In some examples, the instructions 708 can include processor-specific instructions generated by a compiler or an interpreter from code written in any suitable computer-programming language, such as C, C++, C#, etc.

The memory 704 can include one memory device or multiple memory devices. The memory 704 can be non-volatile and may include any type of memory device that retains stored information when powered off. Non-limiting examples of the memory 704 include electrically erasable and programmable read-only memory (EEPROM), flash memory, or any other type of non-volatile memory. At least some of the memory device includes a non-transitory computer-readable medium from which the processor 702 can read instructions 708. A non-transitory computer-readable medium can include electronic, optical, magnetic, or other storage devices capable of providing the processor 702 with the instructions 708 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 708.

The instructions 708 can include an application 718, which may be downloadable over the Internet from an app store, such as the Play Store® by Google® or the App Store® by Apple®. The application 718 may be executable by the processor 702 for causing the processor 702 to perform some or all of the functionality described herein. The application 718 may also be executable by the processor 702 to perform more functionality, less functionality, or different functionality than is described herein.

The computing device 110 also includes input components. One example of an input component is the user input device 710, which may include one user input device or multiple user input devices. Examples of such user input devices can include a mouse, a keyboard, a touchpad, a button, and a touch-screen. Another example of an input component is the sensor 712, which may include one sensor or multiple sensors. Examples of such sensors can include a global positioning system (GPS) unit, a gyroscope, an accelerometer, and an inclinometer. Yet another example of an input component is a camera 716, which may include one camera or multiple cameras.

The computing device 110 further includes output components. One example of an output component is the display 116, which can include a liquid crystal display (LCD) or a light-emitting diode (LED) display. The computing device 110 may also include audio output components like a speaker, and haptic output components like a haptic actuator. But for simplicity, the audio and haptic output components are not shown in FIG. 7.

While FIG. 7 depicts the components (e.g., processor 702, display 116, camera 716, etc.) internal to a single housing, in other examples the components may be distributed and in wired or wireless communication with one another. For example, the display 116 may be a head-mounted display configured to be positioned on a user's head. In such an example, the head-mounted display may be separate from and in communication with the computing device 110 that performs the main processing. As another example, the camera 716 may be external to the housing and coupled to the computing device 110 via a wired or wireless connection. Additionally, although FIG. 7 depicts a certain number and arrangement of components, this is for illustrative purposes and not intended to be limiting. Other examples can include more components, fewer components, different components, or a different arrangement of the components shown in FIG. 7.

Figure 8:
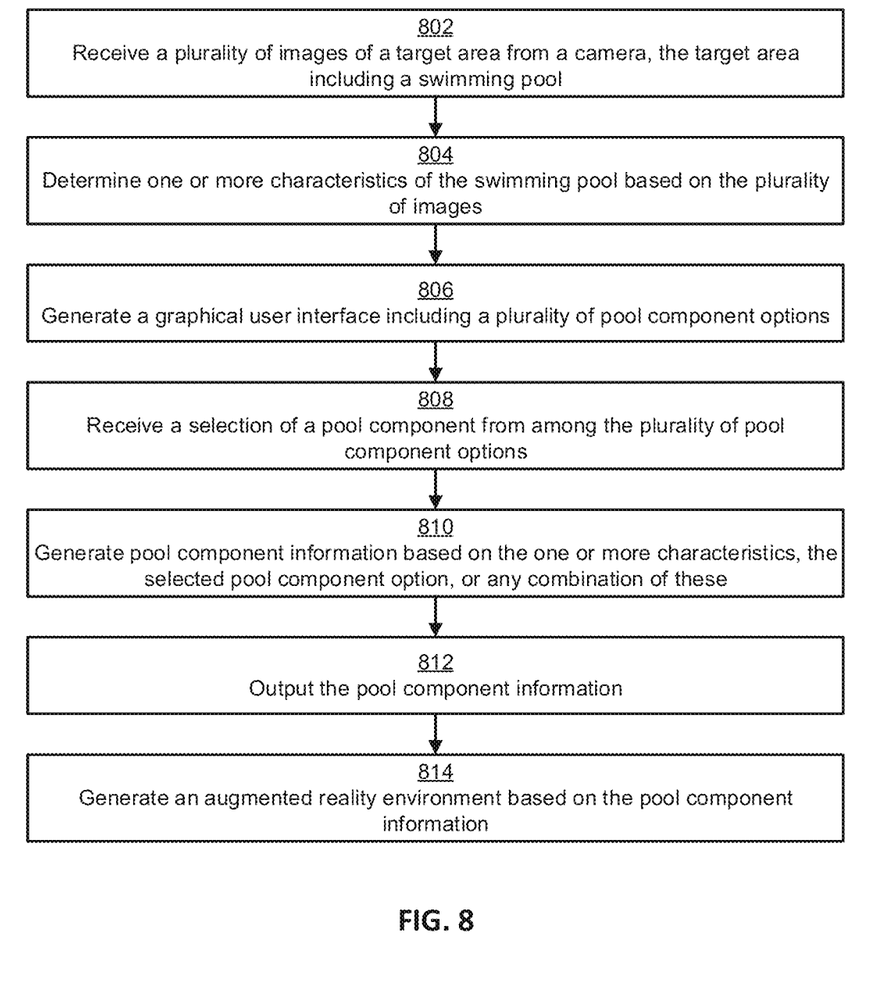
FIG. 8 is a flow chart of an example of a process for implementing some aspects of the present disclosure.

FIG. 8 is a flow chart of an example of a process for implementing some aspects of the present disclosure. While FIG. 8 depicts a certain sequence of steps for illustrative purposes, other examples can involve more steps, fewer steps, different steps, or a different order of the steps depicted in FIG. 8. The steps of FIG. 8 are described below with reference to components of FIG. 7 described above.

In block 802, the processor 702 receives a plurality of images 722 of a target area from a camera 716, where the target area includes a swimming pool. The target area may (or may not) also include physical markers positioned spatially around a perimeter of a swimming pool. Each image in the plurality of images 722 can depict at least a portion of the target area and may be taken from a different angle than the other images in the plurality of images 722.

In block 804, the processor 702 determines one or more characteristics 724 of the swimming pool based on the plurality of images 722. The characteristics 724 may include perimeter characteristics (e.g., the circumference and a shape of the swimming pool) or other characteristics (e.g., a material or orientation of the swimming pool). In some examples, the processor 702 can determine the characteristics 724 of the swimming pool by implementing some or all of the process shown in FIG. 9, as described in greater detail later on. Additionally or alternatively, the processor 702 can determine the characteristics 724 based on a virtual model 720 derived from the plurality of images 722. For example, the processor 702 can generate a virtual model 720 of the swimming pool based on the plurality of images 722. In some such examples, the processor 702 can determine locations of physical markers depicted in the plurality of images 722. The processor 702 can then use relationships between the physical markers to generate a virtual model 720 that is a multidimensional (e.g., 2D or 3D) virtual representation of the swimming pool. After generating the virtual model 720, the processor 702 can determine the perimeter characteristics based on the virtual model 720.

In block 806, the processor 702 generates a graphical user interface including a plurality of pool component options. Examples of the plurality of pool component options can include different types, patterns, colors, materials, ratings, prices, and/or manufacturers of pool components. The processor 702 can output the graphical user interface on a display 116.

In block 808, the processor 702 receives a selection 726 of a pool component option from among the plurality of pool component options. For example, a user can input the selection via a user input device 710.

In block 810, the processor 702 generates pool component information 408 based on the one or more characteristics 724, the selected pool component option 726, or any combination of these. The pool component information 408 can include values for one or more customizable properties (e.g., the perimeter, shape, color, pattern, and material) of a pool component.

In block 812, the processor 702 outputs the pool component information 408. For example, the processor 702 can output the pool component information 408 on the display 116. This may enable the user to manually provide the pool component information 408 to a pool component manufacturer. As another example, the processor 702 can transmit the pool component information 408 over a network to a remote computing device, such as the remote computing device 112 of FIG. 1. In some examples, the remote computing device can be associated with a pool component manufacturer. The remote computing device can receive the pool component information 408 and initiate (e.g., automatically) a process for manufacturing a pool component for the swimming pool, such that the pool component has one or more properties defined by the pool component information 408. In this way, the pool component can be customized for the swimming pool based on the pool component information 408.

In block 814, the processor 702 generates an augmented reality environment based on the virtual model 720, the one or more characteristics 724, the selected pool component option 726, the pool component information 408, or any combination of these. For example, the processor 702 can generate an augmented reality environment that includes a virtual version of a pool component overlapping an image of the swimming pool from among the plurality of images. The virtual version of the pool component may be pre-generated using a graphics engine, such as Unity 3D, and stored in a datastore. The datastore may be local to or remote from the computing device 110. The processor 702 can retrieve the virtual version of the pool component from the datastore and modify the virtual version of the pool component based on the selected pool component option 726. For example, the processor 702 can adjust the virtual version of the pool component based on a color, pattern, or material selected by the user (e.g., in block 810). Additionally or alternatively, the processor 702 can modify the virtual version of the pool component based on the one or more characteristics 724 of the swimming pool (e.g., determined in block 806). The processor 702 can then output the augmented reality environment on the display 116. This may allow a user to visualize what the pool component would look like on the swimming pool.

Figure 9:
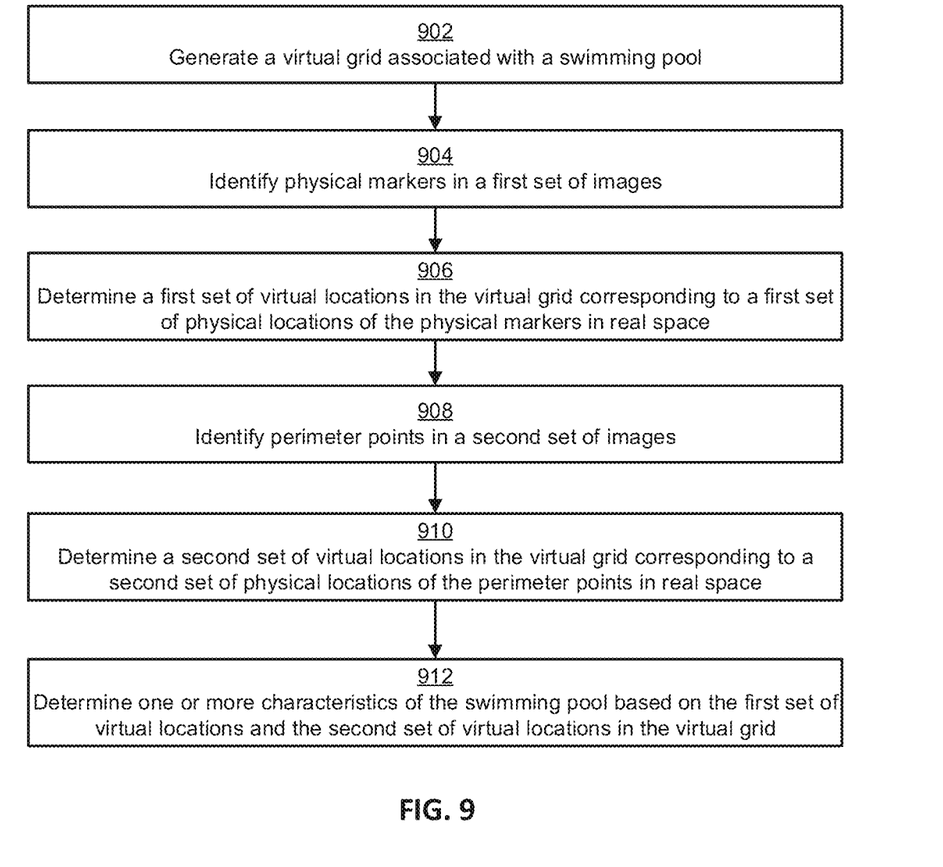
FIG. 9 is a flow chart of an example of a process for determining one or more characteristics of a swimming pool according to some aspects of the present disclosure.

FIG. 9 shows a flow chart of another example of a process for determining one or more characteristics of a swimming pool according to some aspects of the present disclosure. While FIG. 9 depicts a certain sequence of steps for illustrative purposes, other examples can involve more steps, fewer steps, different steps, or a different order of the steps depicted in FIG. 9. The steps of FIG. 9 are described below with reference to components of FIG. 7 described above.

In block 902, the processor 702 generates a virtual grid associated with a swimming pool. The virtual grid may be parallel to a surface plane of the swimming pool and may be located substantially at ground level. In some examples, the virtual grid may be used to anchor the physical markers identified in subsequent steps of the process to a common ground plane.

Figure 10:
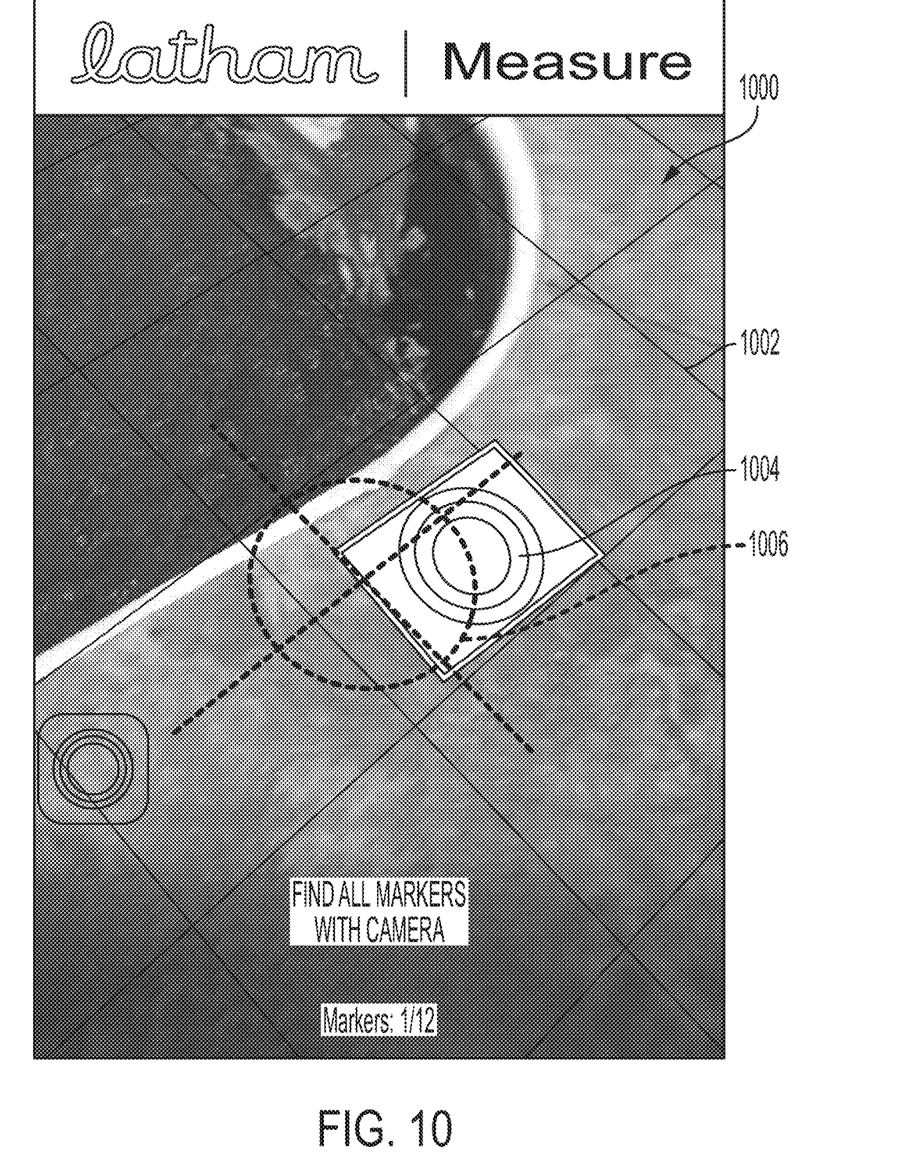
FIG. 10 is an example of an augmented reality environment with a virtual grid according to some aspects of the present disclosure.

One example of such a virtual grid 1002 is shown in FIG. 10. In this example, an augmented reality environment 1000 generated by the application 718 shows the virtual grid 1002 overlaying captured images of a physical marker 1004 located near the pool's edge. Although the virtual grid 1002 is shown in FIG. 10, in other examples the virtual grid 1002 may be hidden from view (e.g., the virtual grid 1002 may not be displayed on the display 116). The augmented reality environment 1000 also includes a virtual aiming tool 1006 (e.g., virtual crosshairs) that is overlaid on top of the images to assist the user in identifying the physical markers in the images.

In block 904, the processor 702 identifies physical markers in a first set of images captured by the camera 716. For example, using the augmented reality environment 1000 of FIG. 10, a user can point the virtual aiming tool 1006 at a location proximate to the swimming pool and operate a user input device 710 to generate a user input indicating that a physical marker 1004 exists at the location. The user can repeat this process for any number of physical markers, to assist the processor 702 in identifying the physical markers in the captured images. It will be appreciated that although this example involves the user manually identifying the physical markers in the images using the virtual aiming tool 1006, in other examples the processor 702 may automatically identify the physical markers in the images using one or more image processing techniques, such as edge detection, segmenting, and smoothing. In some such examples, the virtual aiming tool 1006 may be unnecessary and thus omitted from the augmented reality environment 1000.

In block 906, the processor 702 determines a first set of virtual locations in the virtual grid that correspond to a first set of physical locations of the physical markers in real space. For example, the processor 702 can then correlate the physical location of each physical marker in real space to a particular virtual location in the virtual grid. This process can be repeated for each physical marker, so that the processor 702 can determine a respective virtual location in the virtual grid that corresponds to each physical marker's location in real space.

Figure 11:
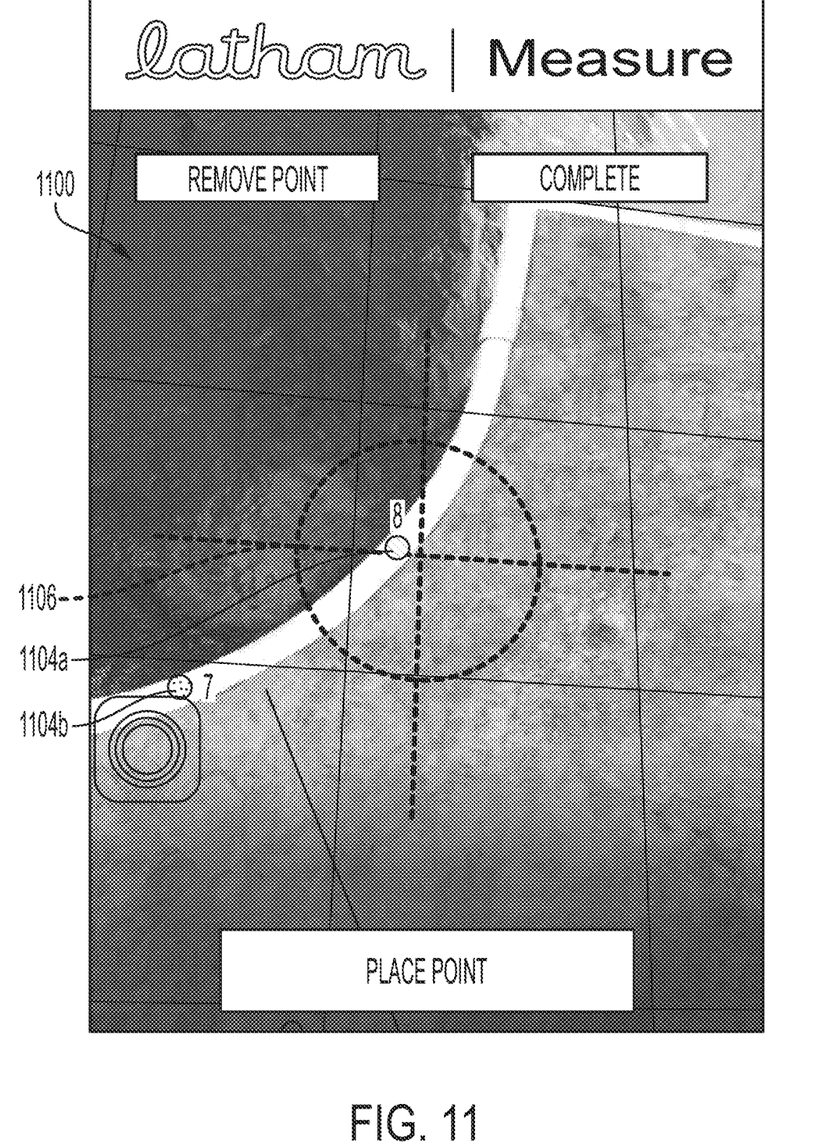
FIG. 11 is an example of an augmented reality environment with a virtual targeting aid according to some aspects of the present disclosure.

In block 908, the processor 702 identifies perimeter points in a second set of images captured by the camera 716. For example, the processor 702 may receive the second set of images from the camera 716 and generate an augmented reality environment in which a virtual aiming tool is overlaid on top of the images. One example of such an augmented reality environment 1100 and virtual aiming tool 1106 is shown in FIG. 11. The user can point the virtual aiming tool 1106 at a location proximate to the swimming pool and operate a user input device 710 to generate a user input indicating that a perimeter point 1104a exists at the location. The user can repeat this process for multiple perimeter points 1104a-b, to assist the processor 702 in identifying the perimeter points in the captured images. In FIG. 11, the user has selected eight perimeter points thus far, as indicated by the number "8" next to perimeter point 1104a. But the user may select any number of perimeter points, with more perimeter points generally resulting in a more accurate and granular determination of the pool's perimeter. It will be appreciated that although this example involves the user manually identifying the perimeter points in the images using the virtual aiming tool 1106, in other examples the processor 702 may automatically identify any number of perimeter points in the images using one or more image processing techniques, such as edge detection, segmenting, and smoothing. In some such examples, the virtual aiming tool 1106 may be unnecessary and thus omitted from the augmented reality environment 1100.

In block 910, the processor 702 determines a second set of virtual locations in the virtual grid that correspond to a second set of physical locations of the perimeter points in real space. For example, the processor 702 can then correlate the physical location of each perimeter point in real space to a particular virtual location in the virtual grid. This process can be repeated for each perimeter point, so that the processor 702 can determine a respective virtual location in the virtual grid that corresponds to each perimeter point's location in real space.

In block 912, the processor 702 determines one or more perimeter characteristics of the swimming pool based on the first set of virtual locations and the second set of virtual locations in the virtual grid. For example, the processor 702 can determine the perimeter shape of the swimming pool based on the first set of virtual locations associated with the perimeter points. The processor 702 can then scale that perimeter shape based on the second set of virtual locations. For example, the processor 702 can receive user input indicating one or more distances between one or more sets of physical markers in real space. Based on the one or more distances, the processor 702 can then determine virtual distances between the second set of virtual locations in the virtual grid. The processor 702 can then scale the perimeter shape generated using the perimeter points to the appropriate size, based on the determined the virtual distances between the second set of virtual locations in the virtual grid. This can result in a properly sized model of the perimeter of the swimming pool, which may then be transmitted to a manufacturer of pool components to customize a pool component for the swimming pool.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A method comprising:
   receiving, by a processor, a plurality of images from a camera, the plurality of images depicting physical markers positioned spatially around a perimeter of a swimming pool in real space;
   receiving, by the processor, a set of user inputs indicating locations of the physical markers in the plurality of images;
   determining, by the processor, a scale of the swimming pool based on relationships between the physical markers in the plurality of images;
   receiving, by the processor, another plurality of images from the camera, the other plurality of images depicting edges of the perimeter of the swimming pool, the other plurality of images being different from the plurality of images;
   receiving, by the processor, another set of user inputs indicating edge locations around the edges of the swimming pool in the other plurality of images, the edge locations being different from the physical markers;
   determining, by the processor, a shape of the swimming pool based on the edge locations in the other plurality of images;
   generating, by the processor, pool component information based on the determined scale and the shape of the swimming pool; and
   outputting, by the processor, the pool component information to a manufacturer of pool components, the manufacturer being adapted to receive the pool component information and manufacture a pool component that is customized to fit the swimming pool based on the pool component information, wherein the pool component is a pool cover or a pool liner, and wherein the manufacturer is configured to manufacture the pool component at a manufacturing location that is offsite from the swimming pool.

2. The method of claim 1, further comprising determining a perimeter of the swimming pool based on a distance in real space between two of the physical markers.

3. The method of claim 2, further comprising receiving the distance in real space as user input via a graphical user interface.

4. The method of claim 2, further comprising determining the shape of the perimeter of the swimming pool by performing edge detection on the other plurality of images.

5. The method of claim 4, further comprising:
generating the pool component information by transforming at least one of the determined perimeter or the determined shape from a first format that is not accepted by the manufacturer into a second format that is accepted by the manufacturer; and
transmitting the pool component information over a network to a remote computing device associated with the manufacturer.

6. The method of claim 4, further comprising generating the pool component information to include a plurality of three-dimensional (3D) plot points in a 3D coordinate system corresponding to the perimeter of the swimming pool.

7. The method of claim 1, further comprising:
generating a graphical user interface including a plurality of pool component options;
receiving a selection of a pool component option from among the plurality of pool component options; and
generating the pool component information based on the selected pool component option.

8. The method of claim 1, further comprising:
generating an augmented reality environment that includes a virtual version of the pool component overlapping an image of the swimming pool, wherein the virtual version of the pool component is generated in the augmented reality environment based on the determined shape.

9. The method of claim 1, wherein the physical markers are devices that are separate and distinct from the swimming pool.

10. The method of claim 1, wherein the physical markers are non-uniformly spaced around the perimeter of the swimming pool.

11. A system comprising:
a camera;
a processor communicatively coupled to the camera; and
a memory including instructions executable by the processor for causing the processor to:
receive a plurality of images from the camera, the plurality of images depicting physical markers positioned spatially around a perimeter of a swimming pool in real space;
receive a set of user inputs indicating locations of the physical markers in the plurality of images;
determine a scale of the swimming pool based on relationships between the physical markers in the plurality of images;
receive another plurality of images from the camera, the other plurality of images depicting edges of the perimeter of the swimming pool, the other plurality of images being different from the plurality of images;
receive another set of user inputs indicating edge locations around the edges of the swimming pool in the other plurality of images, the edge locations being different from the physical markers;
determine a shape of the swimming pool based on the edge locations in the other plurality of images;
generate pool component information based on the determined scale and the shape of the swimming pool; and
output the pool component information to a manufacturer of pool components, the manufacturer being adapted to receive the pool component information and manufacture a pool component that is customized to fit the swimming pool based on the pool component information, wherein the pool component is a pool cover or a pool liner, and wherein the manufacturer is configured to manufacture the pool component at a manufacturing location that is offsite from the swimming pool.

12. The system of claim 11, wherein the memory further includes instructions that are executable by the processor for causing the processor to:
determine a perimeter of the swimming pool based on a distance in real space between two of the physical markers.

13. The system of claim 12, wherein the memory further includes instructions that are executable by the processor for causing the processor to:
generate the pool component information by transforming the determined perimeter from a first format that is not accepted by the manufacturer into a second format that is accepted by the manufacturer; and
transmit the pool component information over a network to a remote computing device associated with the manufacturer.

14. The system of claim 11, wherein the memory further includes instructions that are executable by the processor for causing the processor to:
generate a graphical user interface including a plurality of pool component options;
receive a selection of a pool component option from among the plurality of pool component options; and
generate the pool component information based on the selected pool component option.

15. The system of claim 11, wherein the memory further includes instructions that are executable by the processor for causing the processor to:
generate an augmented reality environment that includes a virtual version of the pool component overlapping an image of the swimming pool, wherein the virtual version of the pool component is generated in the augmented reality environment based on the shape.

16. The system of claim 11, further comprising the physical markers.

17. A non-transitory computer-readable medium comprising program code that is executable by a processor for causing the processor to:
receive a plurality of images from a camera, the plurality of images depicting physical markers positioned spatially around a perimeter of a swimming pool in real space;
receive a set of user inputs indicating locations of the physical markers in the plurality of images;
determine a scale of the swimming pool based on relationships between the physical markers in the plurality of images;
receive another plurality of images from the camera, the other plurality of images depicting edges of the perimeter of the swimming pool, the other plurality of images being different from the plurality of images;
receive another set of user inputs indicating edge locations around the edges of the swimming pool in the other plurality of images, the edge locations being different from the physical markers;

determine a shape of the swimming pool based on the edge locations in the other plurality of images;

generate pool component information based on the determined scale and the shape of the swimming pool; and output the pool component information to a manufacturer of pool components, the manufacturer being adapted to receive the pool component information and manufacture a pool component that is customized to fit the swimming pool based on the pool component information, wherein the pool component is a pool cover or a pool liner, and wherein the manufacturer is configured to manufacture the pool component at a manufacturing location that is offsite from the swimming pool.

18. The non-transitory computer-readable medium of claim 17, further comprising program code that is executable by the processor for causing the processor to:

generate the pool component information by transforming the scale or shape of the swimming pool from a first format that is not accepted by the manufacturer into a second format that is accepted by the manufacturer; and transmit the pool component information over a network to a remote computing device associated with the manufacturer.

19. The non-transitory computer-readable medium of claim 17, wherein the physical markers are devices that are separate and distinct from the swimming pool.

20. The non-transitory computer-readable medium of claim 17, further comprising program code that is executable by the processor for causing the processor to receive the set of user inputs and the other set of user inputs via a graphical user interface.

* * * * *